United States Patent [19]
Thorne et al.

[11] Patent Number: 6,047,289
[45] Date of Patent: Apr. 4, 2000

[54] METHOD AND APPARATUS FOR DIRECTED DATA PROPAGATION

[75] Inventors: Bruce Warner Thorne, Salem; Brian Lee Jarvis, Orem, both of Utah

[73] Assignee: Novell, Inc., Orem, Utah

[21] Appl. No.: 08/965,803

[22] Filed: Nov. 7, 1997

[51] Int. Cl.[7] ........................................... G06F 17/30
[52] U.S. Cl. ............... 707/10; 707/104; 395/200.31; 395/200.2; 395/200.01
[58] Field of Search ............... 707/10, 104; 395/200.31, 395/200.2, 200.01

[56] References Cited

U.S. PATENT DOCUMENTS

| | | | |
|---|---|---|---|
| 5,136,496 | 8/1992 | Tsuboi | 364/132 |
| 5,297,128 | 3/1994 | Kelly, Jr. et al. | 395/650 |
| 5,307,490 | 4/1994 | Davidson et al. | 395/650 |
| 5,499,343 | 3/1996 | Pettus | 395/200.2 |
| 5,537,570 | 7/1996 | Tran | 395/455 |
| 5,621,662 | 4/1997 | Humphries et al. | 364/550 |
| 5,677,851 | 10/1997 | Kingdon et al. | 364/514 |
| 5,696,900 | 12/1997 | Nishigaya et al. | 395/200.01 |
| 5,729,210 | 3/1998 | Kiriyama | 340/825 |
| 5,768,277 | 6/1998 | Ohno et al. | 370/457 |
| 5,784,560 | 7/1998 | Kingdon et al. | 395/200.31 |
| 5,797,004 | 8/1998 | Lindholm et al. | 395/674 |
| 5,805,837 | 9/1998 | Hoover et al. | 395/290 |
| 5,872,969 | 2/1999 | Copeland et al. | 395/671 |

OTHER PUBLICATIONS

Novell's Guide to Netware 4.1 Networks, J. Hughes, et al. 1996; Table of Contents, Chapters 3, 5 and 6.

*Primary Examiner*—Thomas G. Black
*Assistant Examiner*—Frantz Coby
*Attorney, Agent, or Firm*—Dinsmore & Shohl LLP

[57] ABSTRACT

A computer system comprises a management service having a plurality of objects. Each of the objects has at least one associated attribute with associated values. A master object in the management service includes a source attribute with associated data. One or more slave objects in the management service correspond to the master object and are distinct from the master object. Each of these slave objects has a destination attribute which corresponds to the source attribute of the master object. A propagation agent is capable of accessing the slave objects and transmitting the data associated with the source attribute to the destination attributes of the slave objects.

23 Claims, 7 Drawing Sheets

PRIOR ART

METHOD AND APPARATUS FOR DIRECTED DATA PROPAGATION

COPYRIGHTS PRESERVED

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to managing data in computer systems, and will be specifically disclosed as a method and apparatus for directed data propagation in a distributed directory.

BACKGROUND OF THE INVENTION

The virtual explosion of technical advances in microelectronics, digital computers and software have changed the face of modern society. In fact, these technological advances have become so important and pervasive that this explosion is sometimes referred to as "the information revolution." Through telephone lines, networks, satellite communications and the like, information and resources are ever increasingly being accessed and shared.

When a group of computers are connected to one another, such as in a client/server network, a management service is typically used to organize and administer information and resources across the network. Management services usually access or include a collection of objects that represent a variety of things. For instance, some typical objects represent users, groups, printers, computers, and the like. Objects in a management service are often organized in flat domains such as the SECURITY ACCOUNTS MANAGER ("SAM") of WINDOWS NT, in a distributed directory such as NOVELL DIRECTORY SERVICES ("CNDS") of NETWARE or ACTIVE DIRECTORY SERVICES ("ADS") of WINDOWS NT, or in other ways known in the art.

Often, it is desirable that two or more objects have synchronized information. The implementation of catalog services illustrates one example of this arrangement. Catalog services provides a database, sometimes referred to as a catalog, of information about the management service. For instance, the catalog typically contains information relating the various objects and values within the management service. One advantage of a catalog is that one can search the management service through the catalog, which is usually stored locally, thus eliminating the need to traverse all the computers sharing the management service. Ordinarily, an object in the management service represents the catalog. The catalog itself is usually stored as a value in an associated attribute of that object. Since the catalog can be accessed and searched most efficiently when it is stored locally, any computer (typically a server) which will use the catalog preferably has a catalog object. Preferably, the catalogs associated with each of the catalog objects are synchronized so that a search on one catalog will return the same results as all the other catalogs.

Some management services allow for objects to have replicas. Typically, when a change is detected in one object, a replication system will detect and replicate the change to the replicas of that object However, in some situations replication systems are ill-suited to synchronize information, particularly when large amounts of data need to be transmitted. For instance, a catalog can be a very large database. If the replication system were to take its natural course in replicating a change to a catalog, network traffic could be inundated and slowed as the large database is routed through the network. Such a transfer could slow other unrelated network traffic or otherwise negatively effect other services in the computer network.

Replication systems are also ill-suited in some situations to synchronize data by virtue of their organization. Replication systems often work on a partition basis. A partition comprises a block of objects organized into logical groups. Multiple replicas or copies of a partition can be distributed on various servers on the network. Partitions help organize the management service and give the ability to scale the management service across the network, distributing the workload for each of the servers. Partitions are typically transparent to the users and background processes allow the partitions to work in cooperation. As such, any object in the management service could be accessed, however, locally stored objects can be accessed more efficiently. Therefore, a server which regularly accesses a given object will preferably hold a replica of the partition from which the object belongs.

Building on the catalog services illustration, for a computer to have a copy of the catalog object, that computer would need a copy of the entire partition within which the catalog object resides. As such, that computer would necessarily hold all the other objects in the partition, even if that computer does not require access to those other objects, thus wasting network resources. In the past, network administrators have attempted to overcome this problem by defining a separate partition dedicated only to the catalog object, but this arrangement results in the catalog object being placed in a counter-intuitive location relative to the other objects, thus defeating the organizational structure of the management service and the partitions.

Therefore, there is a need for a method and apparatus for synchronizing information without the attendant problems in the prior art.

SUMMARY OF THE INVENTION

Accordingly, an object of the invention is to provide an improved method and apparatus for managing data in a computer system.

Another object of the invention is to provide a method and apparatus for directed data propagation.

A further object of the invention is to provide a method and apparatus for synchronizing values associated with objects in a management system.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

A computer system comprises a management service having a plurality of objects. Each of the objects has at least one associated attribute with associated values. A master object in the management service includes at least one a source attribute with associated data. One or more slave objects in the management service correspond to the master object and are distinct from the master object. Each of these slave objects have a destination attribute which corresponds to the source attribute of the master object. A propagation agent is capable of accessing the slave objects and transmitting the data associated with the source attribute to the destination attributes of the slave objects. Preferably, the computer system further comprises restriction data for defining the conditions upon which the propagation agent will transmit the data to the destination attributes.

Another embodiment of the invention is a method for synchronizing data in a computer system. Data associated with a source attribute of a first object is modified, which modification is detected. One or more secondary objects associated with but distinct from the first object are determined. Next, any transmission restrictions which may have been defined are determined. If any transmission restrictions have been defined, the method waits until such defined transmission restrictions have been satisfied. Then, the data is transmitted to a destination attribute associated with the one or more secondary objects.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers communicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
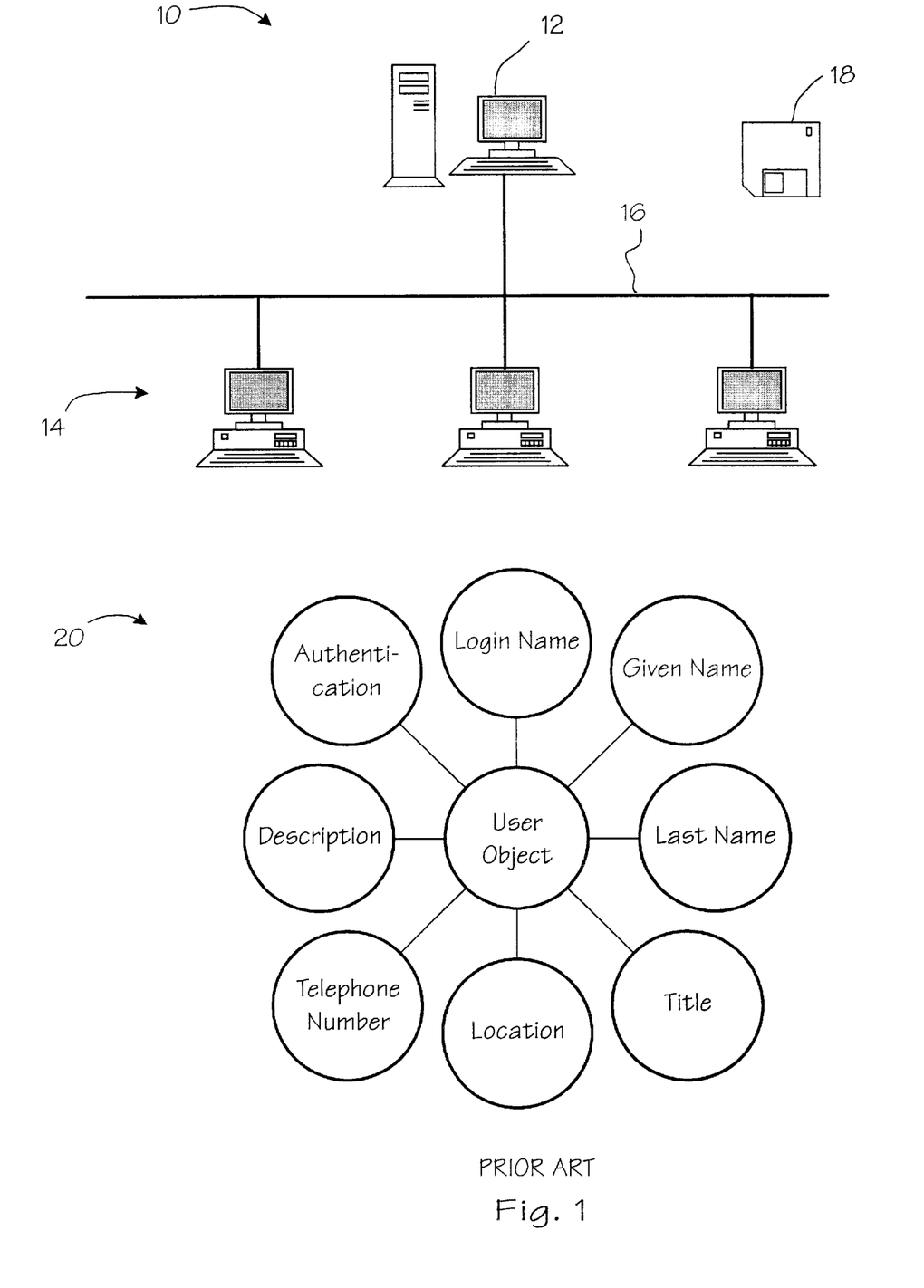
FIG. 1 depicts an example of interconnected nodes, a computer readable medium, and an object with several associated attributes.

FIG. 1 illustrates a sample client/server network 10. As one with ordinary skill in the art will readily appreciate, a client/server network is only one type of network, and a variety of other configurations, such as peer-to-peer connections, are also considered networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable medium, which are sometimes described as being nonvolatile, can retain data in the absence of power so that the information is available when power is restored.

One mechanism to maintain and access information across a network of interconnected nodes is a synchronized hierarchial database called a distributed directory, which is only one type of management service. One example of a distributed directory is the NOVELL DIRECTORY SERVICES ("NDS"), which is based on the X.500 network services protocol developed and published by the CCITT and Open Systems Interconnection Consortium. A distributed directory is an object database as opposed to the traditional relational model under Codd and Date. Usually in the context of a client/server network, a distributed directory spans and is shared by multiple networking server nodes, although a single server node can also maintain a distributed directory.

While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

A management service contains a collection of objects, sometimes referred to as identities, with associated attributes or properties. For example, the object 20 is a User object that represents a human user. Beyond representing users, objects represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

The object 20 has a variety of associated attributes, such as "Given Name", "Last Name", "Title", etc. Each associated attribute has zero or more values. For example, the value for the property "Given Name" might be "George". An attribute is usually based on an attribute syntax. The data which can be entered as a value associated with the attribute is dictated by the attribute syntax. For instance, NDS version 4.1 includes the following syntaxes: Back Link, Boolean, Case Exact String, Case Ignore List, Case Ignore String, Class Name, Counter, Distinguished Name, E-mail Address, Facsimile Telephone Number, Hold, Integer, Interval, Net Address, Numeric String, Object ACL, Octet List, Octet String, Path, Postal Address, Printable String, Replica Pointer, Stream, Telephone Number, Time, Timestamp, Typed Name, and Unknown.

Typically, the structure of the distributed directory is governed by a schema. The schema defines the rules for adding and managing objects and attributes of objects in the distributed directory. These rules are specified through a data dictionary that provides a standard set of data types or classes from which objects can be derived or instantiated. The definitions found in the data dictionary can themselves be represented as objects. Each object in the distributed directory belongs to an object class that specifies which attributes are associated with the object. Generally, the schema is extensible so that it may be tailored to modify existing classes or add new classes.

The schema controls not only the structure of the individual objects, but also the relationship among the objects in the distributed directory. In controlling this relationship, the schema specifies subordination among object classes. That is, for every object there is a group of object classes from which subordinate objects can be formed.

Objects that can contain other objects are called container objects, which are the building blocks of the distributed directory. Objects that cannot contain other objects are known as non-container or leaf objects.

Figure 2:
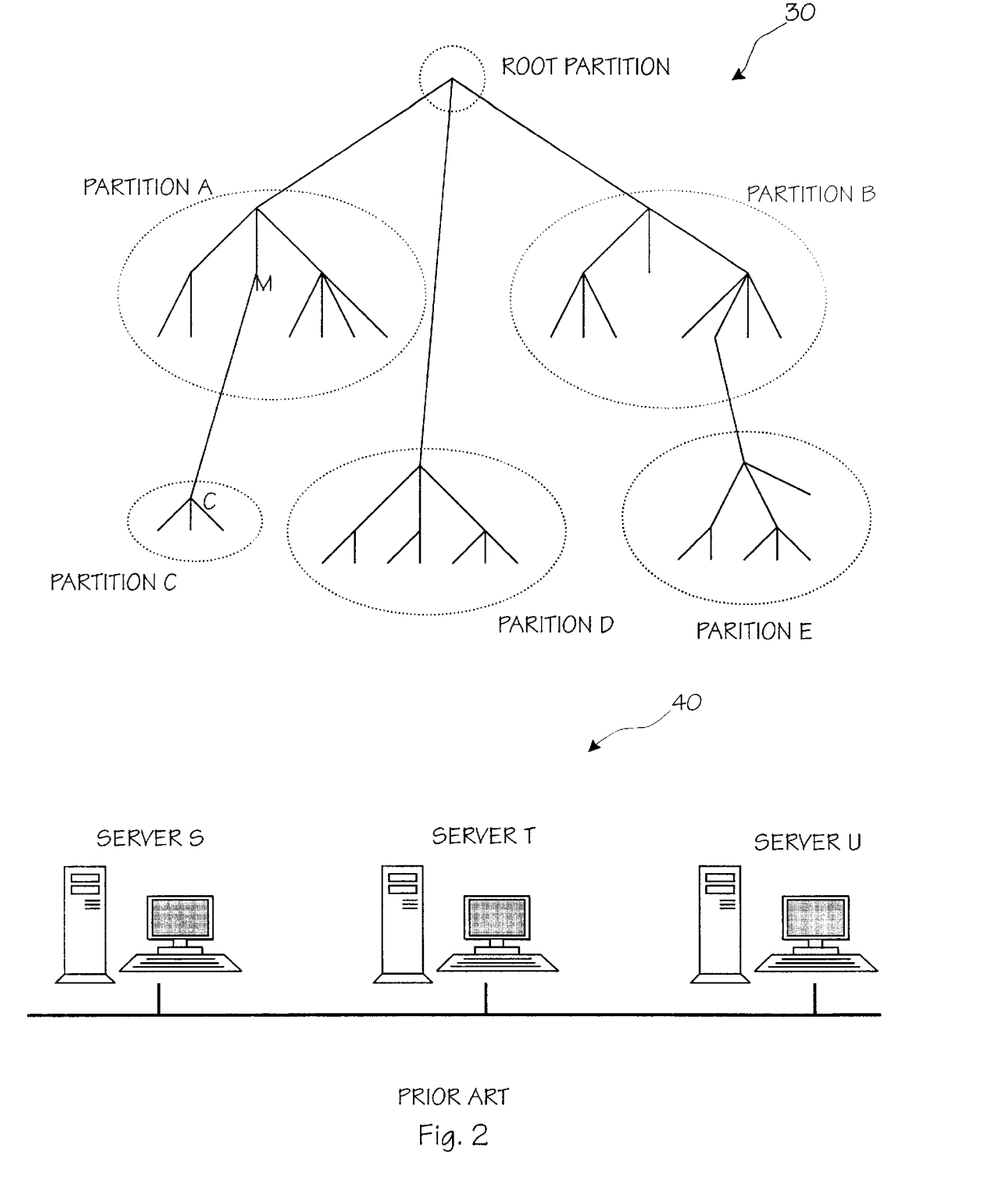
FIG. 2 depicts an example of a distributed directory and several servers accessing the distributed directory.

As shown in FIG. 2, the objects within the distributed directory 30 are often organized in a hierarchial structure, generally in the form of a tree, where the branching points and leaves represent the objects. In this hierarchy, objects closer to the root are superior or parents to objects further from the root, which are considered subordinate or children. For instance, the object M is the parent of the child object C. Object M can also be referred to as the container to object C. The distributed directory 30 is additionally organized in partitions, as illustrated by the dashed ellipses, with each partition comprising a plurality of objects organized as a logical sub-tree. Like objects, partitions closer to the root of the distributed directory 30 are called parent partitions to those further from the root, which are called child partitions. Each partition takes the name of the root object of the sub-tree. For instance, the root object of Partition C is the object C.

Multiple replicas of the partitions are stored across the network 40. Each replica of a partition holds the same set of objects with the same distinguished names ("DN"). The DN is a unique reference that identifies an object's distinct identity and location within a distributed directory. For instance, the DN .CN=SteveM.OU=Denali.OU=Parks.O=NW.C=US isolates Steve M's User object to only one object in the entire distributed directory because it contains a unique path of container object names. Since a replica of a partition holds copies of the objects within the partitions, the copies of the objects are also considered replicas and do not constitute distinct objects. The relative distinguished name ("RDN") is the individual name assigned to an object, which must be unique only in relation to the object's superior object. In the above example, the RDN would be "SteveM".

Each insular server node can hold a unique set of partitions and therefore a unique set of objects within that insular node. For instance, the following table demonstrates a sample partition organization in NDS:

|  | Root | Partition A | Partition B | Partition C | Partition D | Partition E |
| --- | --- | --- | --- | --- | --- | --- |
| Server S | Master | — | Master | Master | Read Only | Master |
| Server T | Read Only | Master | Secondary | — | Master | — |
| Server U | — | Read Only | Secondary | — | Read Only | Secondary |

As suggested by this table, there are three basic kinds of replicas in NDS. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica of its partition data. Rather, it is a skeleton: it stores only attributes to the partition's root most object. Whenever a server holds a complete replica (i.e. Master, Secondary or Read Only) of a partition, but not a directly subordinate partition, it keeps a subordinate reference of the subordinate partition. Referring to FIG. 2 and the above table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different object changes to the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server with get the same result.

When a change is made locally to an entry in the distributed directory, the change is detected and a process in the replication system on the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory.

Figure 3:
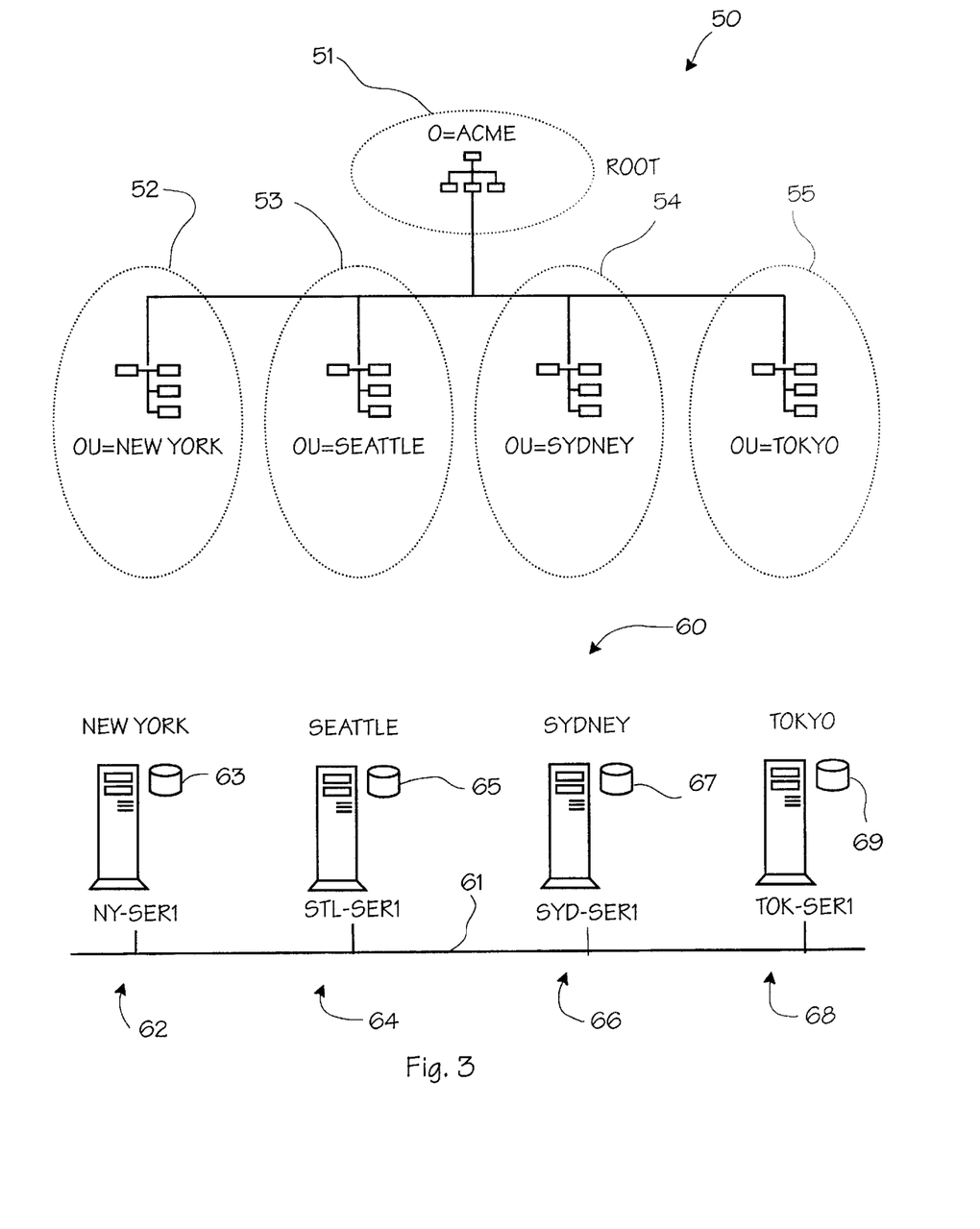
FIG. 3 depicts an example of a partition organization.

FIG. 3 depicts a hypothetical distributed directory 50 for a given organization, which will be used to illustrate an embodiment of the present invention. In this illustration, the organization is a fictitious company called Acme Corporation. The root partition 51 is given the name "O=ACME", wherein the "O" refers to organization. Each of the users, groups, servers, printers, resources, etc. in the Acme Corporation have an object representation in the distributed directory. The distributed directory 50 is divided into separate partitions defining logical groups. Let us assume that the Acme Corporation has four offices: New York, Seattle, Sydney and Tokyo. A natural partition organization is to divide the four offices into separate partitions. Each of the partitions is given the name "OU=NEW YORK" 52, "OU=SEATTLE" 53, "OU=SYDNEY" 54, and "OU=TOKYO" 55, respectively, wherein the "OU" refers to organizational unit.

Likewise, each of the partitions, 52, 53, 54 and 55 has its own sub-tree which defines the hierarchical relationship of the objects relative to one another. Each of the objects related to the various offices are located within the corresponding partition. For example, a User object "Joyce" working in the Seattle office would be located within sub-tree of the OU=SEATTLE partition 53.

The partitioning of the distributed directory 50 is transparent to a user. Assuming the user has adequate access rights, a user could navigate and access all information in the distributed directory regardless of where the partitions may be physically located. However, information can be accessed more efficiently and quicker if it is located or stored locally. Therefore, if a given object will be accessed often, it is preferred that a local server should store a replica of the partition that holds that object.

Since each of the four offices in our illustration principally accesses only objects related to that office, each office should have a corresponding partition stored locally, but not the other partitions. In our example, the distributed directory 50 operates over the client/server network 60. Each of the four offices has a server with a descriptive name, "NY-SER1" 62, "STL-SER1" 64, "SYD-SER1" 66 and "TOK-SER1" 68, respectively. Therefore, each of the partitions 52, 53, 54 and 55 is stored in the hard drive 63, 65, 67 and 69, respectively. The root partition 51 is arbitrarily stored only in the drive 63 of the NY-SER1 62 server. This partition organization can be demonstrated in the following table:

|  | O = ACME | OU = NEW YORK | OU = SEATTLE | OU = SYDNEY | OU = TOKYO |
| --- | --- | --- | --- | --- | --- |
| NY-SERV1 | MASTER | MASTER | — | — | — |
| STL-SER1 | — | — | MASTER | — | — |
| SYD-SER1 | — | — | — | MASTER | — |
| TOK-SER1 | — | — | — | — | MASTER |

While access to the distributed directory 50 from one of the offices will typically be limited to objects within the corresponding partition, in some circumstances the entire distributed directory 50, including other partitions, need to be accessed. While each server can remotely access each of the partitions over the connection 61, such a remote access is generally slower and more expensive compared to local access. One could circumvent the delays of remote access by placing a replica of each partition on each server in the network, but such an arrangement would be impracticable, particularly in larger networks, due to the memory requirements and the resulting network traffic between replicas. A better solution is to use catalog services.

Catalog services of NOVELL works in cooperation with NDS and offers a database of information about the objects and their attributes. In the NDS embodiment of catalog services, a software module, sometimes referred to as a "dredger", searches a portion or the entirety of the distributed directory using a predefined criteria, e.g. all objects, all user objects, only selected attributes, and the like. Preferably, the search is conducted while network activity is low, such as late at night, to prevent slowing other network traffic or services. The results from the search are stored in a local database called a catalog. One advantage of a locally stored catalog is that a query will not traverse the entire network thus reducing the time for results.

The catalog is represented as an object in the distributed directory, with the catalog itself stored as a value in an attribute of the catalog object. Preferably, the attribute has a stream syntax. A stream represents arbitrary binary information and provides a way to make an attribute out of a file on a server. The data stored in a stream attribute has no syntax enforcement of any kind. Preferably, catalogs should be stored locally to improve access performance. A specially designed user interface, such as a snap-in module, is adapted to access the catalog and permit a user to use and interface with the information in the catalog through an NDS browser.

Ideally, each catalog in the distributed directory is synchronized with the other catalogs so that a given query would have the same results regardless of which catalog was being accessed. In the past, such synchronization was achieved with replicas of a singular catalog object. When changes to one catalog object were made, the changes would be replicated to the replicas of that object using the replication system of NDS. However, such an arrangement is impractical in NDS unless all the servers have a replica of the partition which holds the catalog object. In the past, network administrators created a special partition which held only the catalog object, and placed a replica of that partition on each server which needed to access the catalog. However, such an arrangement precludes a logical placement of the catalog object within the distributed directory. A further problem inherent with using a replication system is that the replication system is time and load independent. As a result, when changes are replicated, particularly in the context of an application such as catalog services where the catalog is often very large, the network could become inundated and slowed with the replication traffic.

Figure 4:
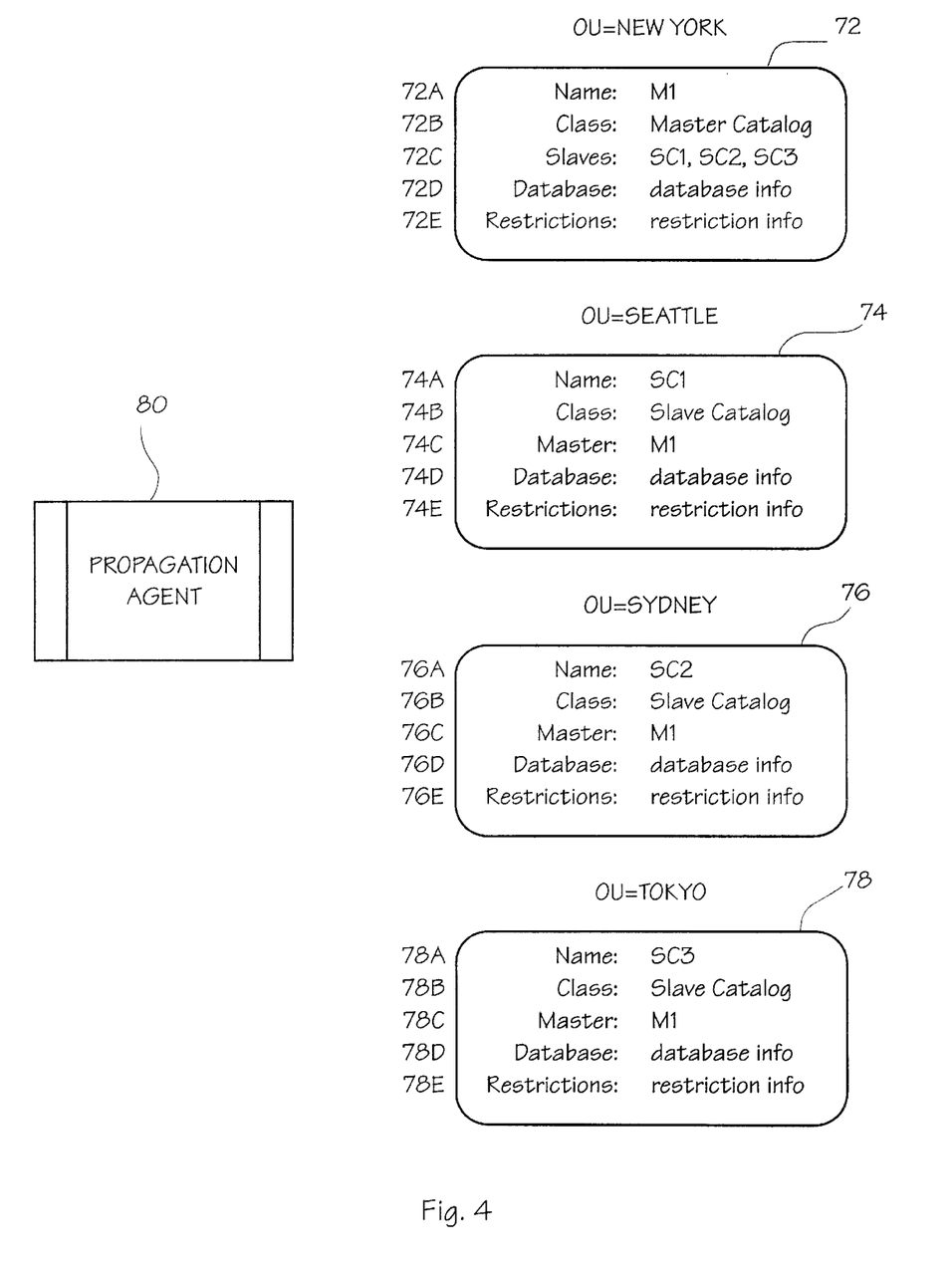
FIG. 4 depicts a plurality of objects and a propagation agent.

FIG. 4 depicts one aspect of the present invention. For the purpose of illustration, the invention will be demonstrated in the context of catalog services and NDS. As one with the ordinary skill in the art will readily recognize, the invention is capable of many alternative embodiments beyond catalog services and NDS. For the purpose of illustration, assume each of the four servers 62, 64, 66 and 68 require access to the catalog. A preferred organization is to place a distinct catalog object 72, 74, 76 and 78 in each partition 52, 53, 54 and 55, respectively. As such, the objects 72, 74, 76 and 78 are strategically located within the logical sub-tree of the respective partitions, thus utilizing the convenient organizational features at the distributed directory. For instance, the object 74 in OU=Seattle partition 53 could be located subordinate to the network administrator's User object, whereas the object 76 in the OU=Sydney partition 54 could be placed subordinate to the human resources container object. Each of the objects 72, 74, 76 and 78 are distinct and have unique DN's. Nevertheless, any or all of the objects could share the same RDN since they are held in different containers.

In this embodiment, each of the objects 72, 74, 76 and 78 are derived or instantiated from the different classes, however, the objects could all be derived from the same class. Specifically, the master or primary object 72 is instantiated from the Master Catalog class, and the slave or secondary objects 74, 76 and 78 are instantiated from the Slave Catalog class. The term "master" in a master/slave relationship should be distinguished from Master replica in the context of partitions. The Master and Slave Catalog classes both inherit from the Catalog class. All the objects 72, 74, 76 and 78 have a "Name" attribute 72A, 74A, 76A and 78A, the values of which correspond to the DN of the corresponding object. The short-hand "M1", "SC1", "SC2" and "SC3" will be used for DNs of the objects 72, 74, 76 and 78, respectively. All the objects 72, 74, 76 and 78 also have a "Class" attribute 72B, 74B, 76B and 78B, the values of which correspond to the class from which the objects were instantiated.

The objects derived from the Master Catalog class include an attribute called "Slaves" 72C, which is a multi-valued attribute that lists the instantiated objects which are slaves of the master object 72. In this example, the Slaves attribute 72C has the names SC1, SC2 and SC3 stored as a value, which correspond to the slave objects 74, 76 and 78, respectively. The objects derived from the Slave Catalog class include an attribute called "Master" 74C, 76C and 78C, which lists the instantiated objects that are masters to the slave object. In this example, the Master attributes 74C, 76C and 78C include only the name M1, which corresponds to the master object 72. The cross referencing of objects in the Slaves attribute 72C and the Master attributes 74C, 76C and 78C is one way of creating a master/slave relationship between the objects. In this embodiment, the Master attribute 74C, 76C and 78C is used to prevent a slave from having multiple masters, which could potentially result in one master object overriding the propagation from another master object. However, slave objects could have multiple masters, each of which would correspond to distinct attribute sets of the slave object.

In this embodiment, each of the four objects 72, 74, 76 and 78 also has an attribute entitled "Database" 72D, 74D, 76D and 78D. The Database attribute is designed to hold the catalog as a value. The catalog is the data which will be synchronized between the objects 72, 74, 76 and 78. Beyond the catalog, other related data stored in different attributes of the same object will also be synchronized. Preferably, the master object 72 holds an updated copy of the catalog as a value in the Database attribute 72D, which is sometimes referred to as the source attribute 72D. The slave objects 74, 76 and 78 also hold the catalog in their respective Database attributes 74D, 76D and 78D, which are sometimes referred to as the destination attributes 74D, 76D and 78D. The value or values stored in the source attribute 72D is preferably propagated or synchronized to the various destination attributes 74D, 76D and 78D. Ideally, the destination attribute of the slave objects will be of the same syntax as the corresponding source attribute of the master objects. In this example, the syntax of the Database attributes is of the stream type, however, other syntaxes could be used for other applications. While the syntax should match, there is no need to match the actual name of the attributes between the master and slave objects.

The master and slave objects have an optional attribute or set of attributes entitled "Restrictions" 72E, 74E, 76E and 78E. The data associated with the Restrictions attributes define the scheduling conditions or criteria for propagating or synchronizing information between the master and slave objects. Sometimes, the conditions or criteria are referred to as "restriction data". Preferably, the restriction data will schedule the propagation of the catalog, which is often quite large, when network traffic is light to minimally influence other network operations or services. There are many potential criteria and combinations which can be set as the restriction data, including, for example, time of day, date, day of week, frequency, size of data, bandwidth of connection, other properties of the connection, and the like. The restriction data can be shared or applied to all the slave objects, or tailored restriction data can apply to individual slave objects. Shared restriction data are preferably stored with the Restrictions attribute 72E of the master object 72. Individual restriction data could be stored either in the Restrictions attributes 74E, 76E and 78E, corresponding to the individual slave object 74, 76 or 78, or with the Restrictions attribute 72E with the master object 72. Preferably, default shared or individual restriction data would be built into the Master and/or Slave classes, which criteria would be implemented should other restriction data not be provided. Alternatively, individual restriction data could be stored in the attribute definitions of the Database attributes 72D, 74D, 76D or 78D, which could be used as default if other restrictions do not apply. In one embodiment, the restriction data associated with the master object 72 defines the default propagation criteria, which will be implemented only as to a slave object 74,76 or 78 which has no restriction data stored under its Restrictions attribute 74E, 76E or 78E. In still another embodiment, an outside policy agent, such as WAN TRAFFIC MANAGER by NOVELL, can be used in lieu of or in addition to the propagation restriction attribute.

The propagation agent 80 is the process that copies or synchronizes the values of the source attribute 72D from the master object 72 to the destination attributes 74D, 76D and 78D of the slave objects 74, 76 and 78. Typically, the propagation agent 80 comprises a series of instructions stored on a computer readable medium. Preferably, the propagation agent 80 will be located on the same server as the master object 72. The propagation agent 80 could take any one of a variety of forms, including the data creation process (such as the dredger in catalog services), the data consumer process, a separate and independent data propagation process, NDS acting on behalf of the master object 72 or its attributes, NDS acting on behalf of each slave object 74, 76 or 78 or its attributes, and the like. Ideally, the values of the source to destination attributes should be propagated in one transaction so that all the values are synchronized.

Figure 5:
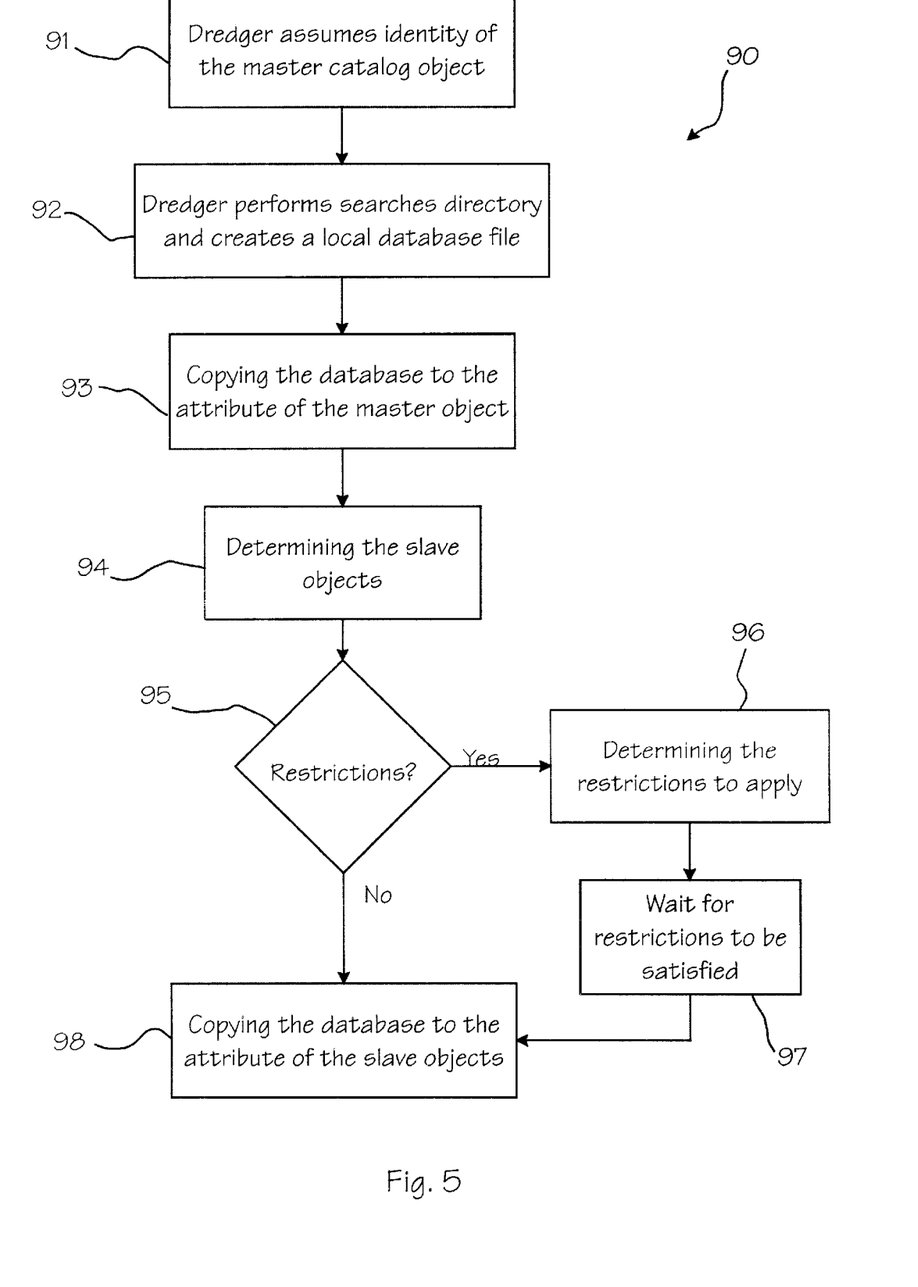
FIG. 5 depicts a flow chart of the steps performed by a dredger acting as a propagation agent.

FIG. 5 depicts a flowchart of one possible set of steps which a dredger can perform to propagate the catalog to the master object 72 and slave objects 74, 76 and 78. In such an embodiment, a sub-set of instructions in the dredger act as the propagation agent 80. Such instructions can be either compiled directly into the dredger or otherwise accessed by the dredger, such as through a DLL, NLM or the like. At step 91, the dredger assumes the identity of the master object 72. This can be achieved by the dredger logging into the distributed directory as the master object 72, which will typically involves some form of verification through a security mechanism. Since the dredger typically needs access to a wide portion of the distributed directory to perform most searches, the master object 72 should have suitable rights to browse the directory, or otherwise be able to acquire suitable rights.

In step 92, the dredger searches the distributed directory using whatever search criteria was defined. The results from the search are compiled into a database file, which is preferably stored on the hard drive of the server from which the dredge operation was initiated. This database file is the catalog. At step 93, the catalog is copied to the source attribute 72D. In this embodiment, the source attribute 72D has a stream syntax, which is single-valued. Unlike other attributes which can manipulated by the Read and Modify NDS operations, stream attributes must be read or written using the NWDSOpenStream function followed by normal file access operations.

At step 94, the Slaves attribute 72C is read to determine the DNs of the slave objects which are associated with the master object 72. The standard NDS operation Read is preferably used to determine the slave names. At decision block 95, the propagation agent 80 determines whether any restrictions apply to the propagation of the catalog from the master object 72 to the slave objects 74, 76 and 78. Step 95 is preferably achieved using the NDS Read operation to read the Restrictions attributes 72E, 74E, 76E and 78E of the master and slave objects. At step 96, the restriction data determined in step 97 is compared, and any default, group and individual restrictions are resolved, to determine which restrictions should be applied in synchronizing the catalog between the master and slave objects. After the restrictions data has been have been satisfied in step 97, or if no restrictions apply from step 95, then the catalog is stored in the Database attributes 74D, 76D and 78D in the slave objects using the NWDSOpenStream function. If the dredger is logged into the distributed directory as the master object 72, the master object should have suitable rights to modify the slave objects 74, 76 and 78.

The following pseudo code demonstrates another embodiment of the propagation agent 80 in the context of a dredger:

```
/******************************************************************
**
* (C) Unpublished Copyright of Novell, Inc. All Rights Reserved.
*
******************************************************************
**/
void NDSCSearch( )
{
do
{
/* wait on the container queue and get a container to search when available */
/* search this container */
/* if objects found then place them in the catalog database */
/* look for containers within this container */
/* add containers to the search queue */
/* if no more containers to add and this is the last one, NDSCCloseDredge */
} while ((curDredgeThreads <= maxDredgeThreads) && !closeThreads);
curDredgeThreads--;
}
void NDSCCloseDredge( )
{
/* close the local database file to flush buffers */
/* open the local database file in preparation to copy to catalog object */
/* call NDSCWriteCatalog to write catalog to catalog object */
/* if no errors writing to catalog, update time of next dredge */
/* close local catalog database */
/* delete local catalog database */
}
/******************************************************************
** FUNCTION: NDSCWriteCatalog
**
** DESCRIPTION: Write catalog and error file to catalog object.
**
******************************************************************/
NWDSCCODE NDSCWriteCatalog( )
{
/* update log information in preparation to write */
/* open master catalog stream */
/* write local database to master catalog stream attribute */
do
{
len = read( local catalog database );
if (len > 0)
write( master catalog stream );
} while (len > 0);
/* write log */
/* write to slave catalogs */
```

```
slaveCatalog = pCatInfo->slaveCatalog;
/* reset local database pointer to beginning of file */
/* open slave catalog stream attributes */
while (slaveCatalog)
{
fh[cnt++] = open( slaveCatalog );
slaveCatalog = slaveCatalog->next;
}
do
{
len = read( local catalog database );
slaveCatalog = pCatInfo->slaveCatalog;
if (len > 0)
{
for (i=0; i < cnt; i++)
{
write( slave catalog stream - fh[i] )
}
}
} while (len > 0);
/* write log information to each slave */
/* close all slave handles */
} /** end NDSCWriteCatalog **/
```

In another embodiment, NDS is modified to act as the propagation agent 80. In this embodiment, the master/slave concept is abstracted into the schema so that it can be used by other classes of objects beyond the Catalog class. One way to build the master/slave relationship into the schema is the add two meta-attributes to the schema A meta-attribute refers to an attribute of the class definition. An object instantiated from that class will not itself have the meta-attribute, but the meta-attribute can be read from the class definition in the schema. These two meta-attributes can then be added to any class definition to establish a master/slave relationship. First, SlaveClassDefs is a multi-valued attribute that is populated on the class definitions of master objects. This attribute will name the class definitions of slaves that name this class as a master. This attribute is used so that an instantiated master object can look at its own class definition and get the names of slave class definitions. Given the slave class definitions, the master object can look up what the slaved attributes and arrange for their propagation. Second, SlavedAttributes is a multi-valued attribute that is populated on class definitions of slave objects. The attribute includes the master class name (Master Class Name), the master's source attribute name (Master Attribute), and the corresponding slave's destination attribute name (Slaved Attribute). The source and destination attributes should be of the same attribute syntax.

Figure 6:
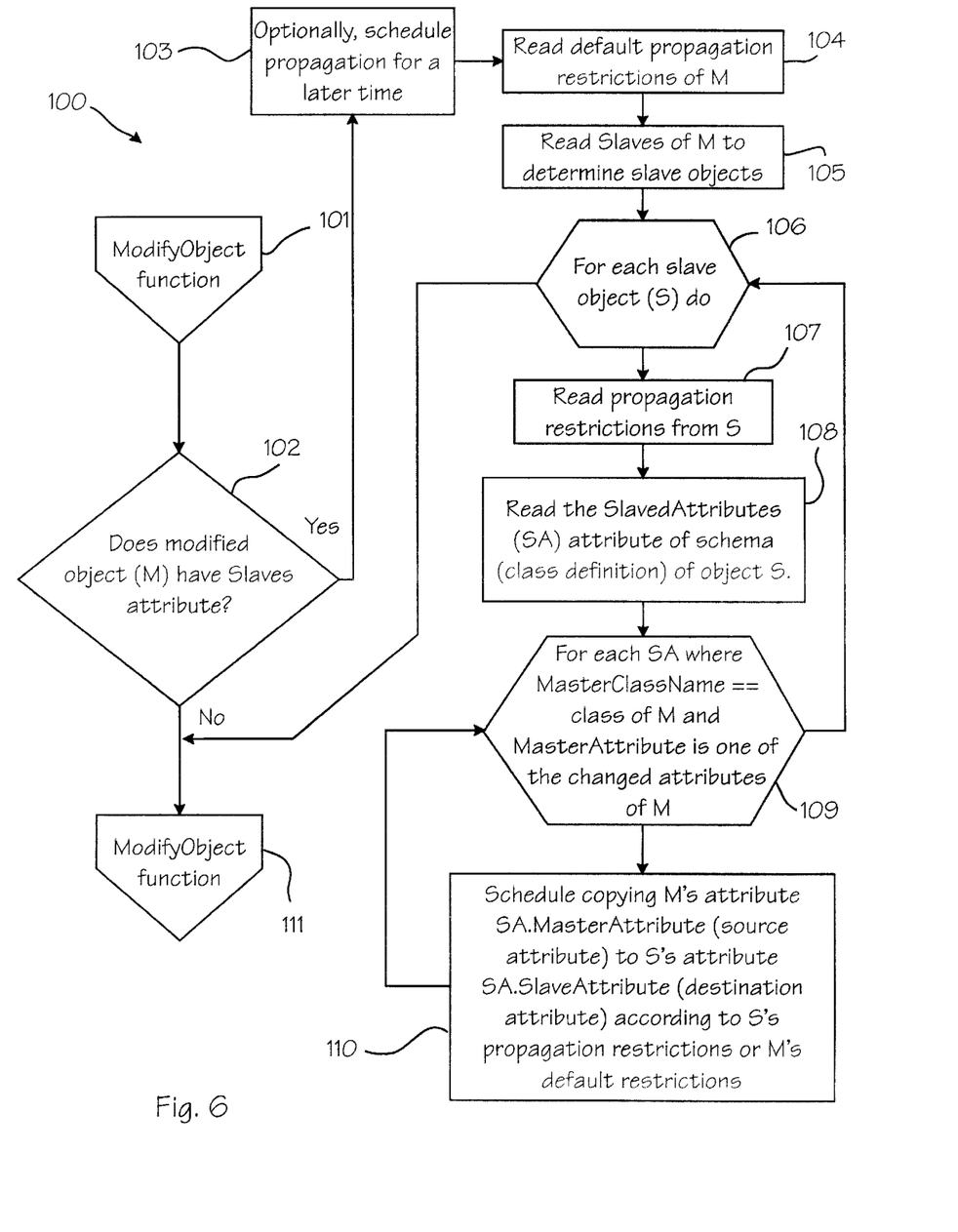
FIG. 6 depicts a flow chart of the steps performed by a management service acting as a propagation agent.

FIG. 6 depicts a flow chart 100 in which the management service can be modified to act as the propagation agent and employ the master/slave concept abstracted into the schema InNDS, changes to an object are processed by the ModifyObject function 101. Within that function, decision block 102 and the subsequent steps can be programmed. At decision block 102, it is determined whether the object being modified has a Slaves attribute with one or more values. Preferably, the Slaves attribute will be similar to the attribute 72C. If the modified object does not satisfy step 102, the ModifyObject function 111 continues as normal. If decision block 102 is satisfied, the method continues to optional step 103 where the propagation is scheduled for a later time. If this optional step 103 is implemented, it is preferred that a separate process thread is initiated and that the ModifyObject function 111 will continue as normal.

In step 104, the default propagation restrictions are read from the modified object, assuming the modified object has propagation restrictions associated with it. Preferably, the default propagation restrictions are stored as data in an attribute of the modified object. In step 105, the Slaves attribute is read to determine the various slave objects which correspond to the modified object. At step 106, a "do" loop is initiated for each slave object listed in the Slaves attribute.

At step 107, the propagation restrictions of the slave object are read, if such object has any propagation restrictions. Preferably, the propagation restrictions are stored as a value in an attribute associated with the slave object. At step 108, the source and destination attributes are read from the SlavedAttributes attribute from the class definition of the slave object. In step 109, a "do" loop is initiated for each source/destination attribute pair listed in the SlavedAttributes. In step 110, the propagation for each attribute pair is scheduled. The modified object's source attribute is scheduled to be copied to the destination attribute of the slaves object according to slaves object propagation restrictions, or if no such slave propagation restrictions exist, then using the modified object's default propagation restrictions. After all attribute pairs are processed in the loop starting at 109, the process returns to 106 for the next slave object. After all slave objects are processed, the process returns to the ModifiedAttribute function 111 for continued processing.

In another embodiment of the invention, the propagation agent comprises two separate agents: a detector agent and a copier agent. The detector agent comprises a process that first becomes aware that a source attribute on the master object has changed and should be copied to the slave object. Once detected, the detector agent informs the copier agent that a change is needed. The copier agent is responsible for copying data. Preferably, the copier agent is also responsible for security issues (e.g. guaranteeing that it only makes valid modifications and that it is not the victim of a unauthorized detector agent).

The detector and copier agents can both be encoded within the same process, as described in the previous embodiments, or alternatively exist as separate processes located on the same or different computers. In either case, the detector and copier agents should have appropriate rights in the distributed directory to perform their respective tasks. Preferably, the detector and copier agents will be processes in NDS. Generally, a process on a server where an object is stored has access to that object. However, rights should be assigned for processes which may require access to objects located on different servers. The following table demonstrates the appropriate rights for the detector and copier agents based on their location.

| Copier Agent Location | Rights Needed by Copier Agent | Rights Copier Agent has Due to its Location |
|---|---|---|
| Where master object is stored. | Write permission on slave object's attributes. | Read permission on master object's attributes. |
| Where slave object is stored. | Read permission on master object's attributes. | Write permission on slave object's attributes. |
| An arbitrary location. | Read permission on master object's attributes and write permission on slave object's attributes. | None |
| Detector Agent Location | Rights Needed by Detector Agent | Right Detector Agent has Due to its Location |
| Where master object is stored. | None | Read permission on master object's attributes. |
| Where slave object is stored. An arbitrary location. | Read permission on master object's attributes. | None |

In another embodiment of the invention, NDS is integrally involved in the propagation of data and the master/slave relationship is maintained on an object level. Using this embodiment, the Slave object can have greater control in establishing the master relationship. For instance, a manager may desire that his telephone number should be synchronized to match the telephone number of his administrative assistant. The manager could indicate that the Telephone Number attribute (the destination attribute) associated with his user object be slaved with the telephone number attribute (the source attribute) of the assistants' user object.

An attribute associated with instantiated objects (as opposed to a meta-attribute) called "Slaved Attribute" is added, possibly to all classes, which is associated with the slave object. The Slaved Attribute has three fields or members: (1) "Master Object" which is the DN of the master object, (2) "Master Attribute" which is the name of the source attribute on the Master Object, and (3) "Slave Attribute" which is the name of the destination attribute on the Slave object.

An attribute associated with instantiated objects called "Mastered Attribute" is also added, possibly to all classes, which is associated with the master object. Preferably, this attribute is read-only and can only be set by NDS processes, such that the user cannot modify it but the user can read values associated with the object. The Mastered Attribute has three fields or members: (1) "Slave Object" which is the DN of the slave object, (2) "Master Attribute" which is the name of the source attribute on the Master object, and (3) "Slave Attribute" which is the name of the destination attribute on the Slave Object. The Mastered Attribute is multivalued so multiple master/slave relationships can be stored in this attribute. NDS maintains all Mastered Attribute attributes so that each one is a paired with a corresponding Slaved Attribute. Thus, when a Slaved Attribute is added, modified, or removed, NDS will make a corresponding change to the corresponding Master Attribute.

Building on the manager/assistant example, the manager can control the establishment of the master/slave relationship. Assume the manager's user object has rights to modify the Telephone Number and Slaved Attribute attributes, as well as rights to read the Telephone Number attribute on my assistant's object. Using the standard NDS operation Modify, the manager would change his Telephone Number attribute to be synchronized with that of the Assistant's user object. Preferably, the interface will take the form of a snap-in module which will provide a graphical user interface with a "link" selection, which will then prompt the selection of the source and destination attributes. Corresponding values will be added, preferably by the interface or snap-in, to the Slaved Attribute of the manager's user object with components: Master Object=DN of the assistant's user object, Master Attribute=Telephone Number, and Slave Attribute=Telephone Number. Values will also be added, preferably automatically by NDS upon detecting the Slaved Attribute added to the manager's object, to the Mastered Attribute of the assistant's user object with components: Slaved Object=DN of the manager's user object, Master Attribute=Telephone Number, Slave Attribute=Telephone Number. Having established a master/slave relationship, when the Telephone Number attribute of the assistant's user object is changed, the identical change will automatically be made to the Telephone Number attribute of the manager's user object.

Figure 7:
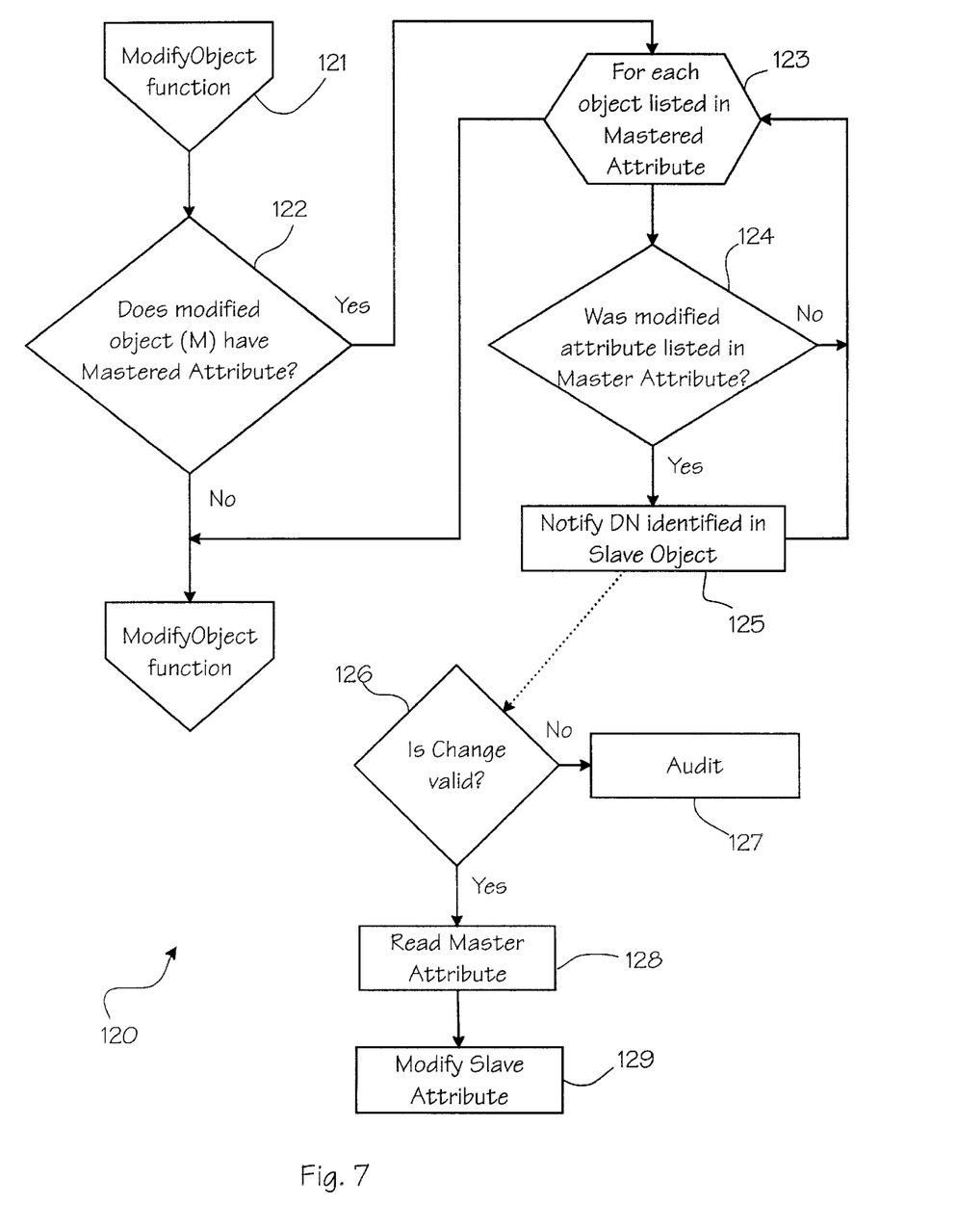
FIG. 7 depicts a flow chart of the steps performed by a management service acting as a propagation agent.

FIG. 7 depicts a flow chart 120 of one way that NDS can be modified to accommodate a master/slave relationship. Within the ModifyObject function 121, decision block 122 determines whether the modified object (M), in this case the assistant's user object, has a Mastered Attribute. If so, the flow chart continues to step 123. If not, the ModifyObject function continues as normal. At step 123, a "do" loop is started for each slave object listed in the Mastered Attribute of M. At decision block 124, the method determines if the modified attribute of M matches the attribute indicated by the Master Attribute member. If so, the process continued to step 125, and if not the process loops back to 123. At step 125, the object indicated in the Slave Object member is notified that one of its slaved attributes needs changing. The notification can take a variety of forms, but preferably includes the following data: M's DN, Master Attribute, and Slave Attribute. After notification, the process loops back to 123. Once all the slave objects listed in the Mastered Attribute have been processed, or if no values exist, control is returned to the ModifyObject function for normal processing.

Upon receipt of the notification, the server holding a replica of the slave object determines in step 126 whether the change is valid. This step preferably entails checking that the values in the Slaved Attribute correspond to the notification and that the source attribute has indeed changed. If the change is invalid, the access will be audited 127. On the other hand, if the change is valid, the source attribute of M identified in the Master Attribute member is read 128 and the resulting value is written to the destination attribute identified in the Slave Attribute. While not explicitly depicted in the flowchart 120, restriction requirements could readily be included within the method.

In yet another embodiment of the invention, the detector agent takes the form of a global event system. An attribute associated with an instantiated slave object is added, possibly to all classes, called "Slaved Attribute" having three fields or members: (1) "Master Object" which is the DN of the master object, (2) "Mastered Attribute" which is the name the source attribute on Master Object, and (3) "Slaved Attribute" which is the name of the destination attribute on the Slave Object. A corresponding "Mastered Attribute" may optionally be added and maintained on the master object for users' convenience, but is not needed for NDS to operate.

The copier agent is any process that has rights to modify the slaved attributes. By way of illustration, establishing the master/slave relationship will be described in the context of the manager/assistant example. Assume the manager's user object ("S") has rights to modify his Telephone Number and Slaved Attribute attributes, and rights to read Telephone Number attribute of the assistant's user object ("M"). The manager first sets S's Telephone Number to be synchronized with M's Telephone Number by entering the following values into S's Slaved Attribute (SA): Master Object-M, Mastered Attribute=Telephone Number, Slaved Attribute= Telephone Number.

The global event system is a process anywhere on the network that listens for global events. Any process or object which is registered with the global event system is notified when a predefined criteria is satisfied. Preferably, the copier agent, which is arbitrarily located, registers with the global event system for information on all Slaved Attribute modifications on all objects (or some subset of objects). When the manager changes S's SA, the copier agent is notified and registers for notification with the global event system for information when attribute SA.Mastered Attribute of SA.Master Object changes. Likewise, when a Slaved Attribute is deleted, the copier agent will retract its corresponding registration with the global event system. In our example, when the attribute SA.Mastered Attribute is changed in the object SA.Master Object, the global event system will notify the copier agent. Upon receipt of the notification, the copier agent verifies that the change notification is valid. If everything is okay, the copier agent then changes the destination attribute (e.g. SA.Slaved Attribute) to match the source attribute (e.g. the attribute SA.Mastered Attribute). While not expressly described in this illustration, propagation restrictions can readily be included with the embodiment.

In a variation to any one of the foregoing embodiments, the destination attribute of the slave object could be a multivalued attribute. In such a situation, the destination attribute could have multiple master objects each having one or more associated source attributes. The Source attributes could be either single or multivalued. When the detector agent determines a change has occurred in one of the source attributes, the corresponding value in the destination attribute could be changed. In NDS, it is preferred that when a change is detected in a Source attribute, all of the source attributes are read and the entire multivalued destination attribute be rewritten.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the invention has been illustrated in the context of catalog services, however, the invention can be used to propagate any information, regardless of the application or syntax. Likewise, the invention has utility in systems other than NetWare, including, for example, Windows NT, Windows 95, OS/2, Macintosh, Vines, Unix, etc. In addition, the invention is applicable to management systems other than NDS, such as SAM, ADS, or STREET TALK by BANYAN. Beyond these management services, the invention can also be used with other programs that maintain their own datalresource. Accordingly, this invention is intended to embrace all alternatives, modifications, and variations that fall within the spirit and broad scope of the amended claims.

We claim:

1. A computer system, comprising:
   a) a network management service comprising a plurality of objects, each object having at least one associated attribute with associated values;
   b) a master object in said network management service comprising a reference within the network management service to identify the master object, said master object further comprising a source attribute having data associated therewith;
   c) one or more slave objects in said network management service corresponding to said master object, each of said one or more slave objects comprising a distinct reference within the network management service to identify the slave object, said distinct reference being different from the reference of the master object, each of said one or more slave objects having a destination attribute corresponding to the source attribute of the master object; and
   d) a propagation agent capable of accessing the one or more slave objects and transmitting the data associated with the source attribute to the destination attribute of the one or more slave objects.

2. A computer system as recited in claim 1, wherein the network management service comprises a distributed directory.

3. A computer system as recited in claim 2, further comprising a plurality of partitions in the distributed directory, and the master and slave objects are each located in different partitions.

4. A computer system as recited in claim 1, further comprising restriction data defining the conditions upon which the propagation agent will transmit data.

5. A computer system as recited in claim 4, wherein the restriction data is stored as a value in an attribute of the master or slave objects.

6. A computer system as recited in claim 1, wherein the propagation agent is part of the management service.

7. A computer system as recited in claim 6, further comprising values stored with the class definition of the master object indicating the class of the one or more slave objects.

8. A computer system as recited in claim 6, further comprising values stored with the class definition of the one or more slave objects indicating the source attribute and the destination attribute.

9. A computer system as recited in claim 1, further comprising a list of the one or more slave objects, said list being stored as a value in an attribute associated with the master object.

10. A computer system as recited in claim 1, wherein each of the one or more slave objects has an associated attribute with data identifying the master object.

11. A computer system as recited in claim 1, wherein the data associated with the source attribute comprises a catalog.

12. A computer system as recited in claim 1, wherein the propagation agent comprises a detector agent and a copier agent.

13. A computer system as recited in claim 1, wherein the master and slave objects are instantiated from different classes.

14. A computer system as recited in claim 1, wherein the master object has a plurality of source attributes and each source attribute has at least one corresponding destination attribute.

15. A computer system as recited in claim 1, further comprising a policy manager controlling the conditions for transmitting data.

16. A method of synchronizing data in a computer system, comprising the steps of:
   a) detecting that data associated with a source attribute of a first object in a network management system has been modified, said first object having a reference for identifying the first object in the network management system;
   b) determining one or more secondary objects in the network management system, each of said secondary objects being associated with the first object and comprising a unique reference for identifying the secondary object within the network management system, said reference being distinct from the reference of the first object;
   c) determining whether any transmission restrictions have been defined;
   d) if any transmission restrictions have been defined, waiting until such defined transmission restrictions have been satisfied; and
   e) transmitting the data to a destination associated with the one or more secondary objects.

17. A method as recited in claim 16, wherein step (b) comprises reading a list of secondary objects stored as a value in an attribute of the first object.

18. A method as recited in claim 16, wherein step (c) comprises the step using restriction data stored with the first object as the transmission restrictions unless restriction data is stored with the secondary objects, in which case such later restriction data is used as the transmission restrictions.

19. A computer readable medium comprising instructions capable of performing the method of claim 16.

20. A network, comprising:
   a) a first node and a second node capable of sending and receiving messages between each other over a connection, said first and second nodes both sharing a distributed directory comprising a plurality of objects;
   b) a primary object in the distributed directory of a first object type being located in the first node, said primary object having a source attribute with associated data;
   c) a second object in the distributed directory of a second object type being located in the second node, said second object being distinct from the first object and having a destination attribute corresponding to the source attribute;
   d) identification data stored with the first object sufficient to determine said second object; and
   e) a propagation agent operative to access the list, read the data associated with the source attribute, and propagate the data associated with the source attribute to the destination attribute of the second object.

21. A computer network as recited in claim 20, further comprising restriction data defining the conditions for synchronizing the data associated with the source attribute to the destination attribute of said second object.

22. The computer system of claim 11, further comprising means for creating the catalog.

23. The computer system of claim 2, wherein the references are distinguished names.

* * * * *